US009158514B2

(12) United States Patent
Guan et al.

(10) Patent No.: US 9,158,514 B2
(45) Date of Patent: Oct. 13, 2015

(54) METHOD AND APPARATUS FOR PROVIDING CHANGE-RELATED INFORMATION

(71) Applicant: International Business Machines Corporation, Armonk, NY (US)

(72) Inventors: Xiao Feng Guan, Shanghai (CN); Jian Jiang, Shanghai (CN); Cao Lei, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 80 days.

(21) Appl. No.: 14/035,385

(22) Filed: Sep. 24, 2013

(65) Prior Publication Data

US 2014/0096115 A1    Apr. 3, 2014

(30) Foreign Application Priority Data

Sep. 26, 2012    (CN) .......................... 2012 1 0364163

(51) Int. Cl.
*G06F 9/44*      (2006.01)
*G06F 9/45*      (2006.01)
*G06F 11/36*     (2006.01)

(52) U.S. Cl.
CPC ................ *G06F 8/41* (2013.01); *G06F 11/368* (2013.01)

(58) Field of Classification Search
CPC .................................. G06F 11/368; G06F 8/41
USPC ....................................................... 717/140
See application file for complete search history.

(56) References Cited

U.S. PATENT DOCUMENTS

| 6,149,318 | A  | * | 11/2000 | Chase et al. ................ 717/131 |
| 7,475,386 | B1 | * | 1/2009  | Shapiro et al. ............... 717/128 |
| 7,484,205 | B2 | * | 1/2009  | Venkatapathy ............... 717/158 |
| 7,503,037 | B2 | * | 3/2009  | Banerjee et al. ............. 717/124 |
| 7,840,944 | B2 | * | 11/2010 | Brunswig et al. ............ 717/124 |
| 8,117,598 | B2 |   | 2/2012  | Johnson et al. |
| 8,161,458 | B2 |   | 4/2012  | Johnson et al. |
| 8,196,115 | B2 |   | 6/2012  | Dimpsey et al. |
| 8,209,671 | B2 |   | 6/2012  | Tateishi et al. |

(Continued)

OTHER PUBLICATIONS

Biswas, S. et al., "Regression Test Selection Techniques: A Survey," Informatica, vol. 35, No. 3, pp. 289-321, Oct. 2011.

(Continued)

*Primary Examiner* — Don Wong
*Assistant Examiner* — Theodore Hebert
(74) *Attorney, Agent, or Firm* — Cuenot, Forsythe & Kim, LLC (57) ABSTRACT

Providing change information includes obtaining information of a change track that changes software source code, wherein the change track includes a change item, identifying at least one preliminary candidate change item from the change item, wherein the preliminary candidate change item is a change item causing execution of the source code to change, and inserting an instrument in the source code at a location corresponding to the at least one preliminary candidate change item so information of at least one candidate change item is outputted in testing the source code using a test case. The at least one candidate change item is a change item related to the test case from the at least one preliminary candidate change item. The information of a change track is combined with the information of a candidate change item. The change-related information is provided based on the result of the combination.

20 Claims, 6 Drawing Sheets

(56) References Cited

U.S. PATENT DOCUMENTS

| | | | |
|---|---|---|---|
| 2004/0054992 A1* | 3/2004 | Nair et al. | 717/138 |
| 2008/0270995 A1* | 10/2008 | Dimpsey et al. | 717/128 |
| 2009/0089745 A1* | 4/2009 | Johnson et al. | 717/107 |
| 2010/0131939 A1* | 5/2010 | Hieb et al. | 717/169 |
| 2014/0096115 A1* | 4/2014 | Guan et al. | 717/140 |

OTHER PUBLICATIONS

Engstrom, E. et al., "Improving Regression Testing Transparency and Efficiency With History-Based Prioritization—An Industrial Case Study," in Proc. of 4th Int'l. Conf. on Software Testing Verification and Validation, IEEE Computer Society, 2011, 10 pgs.

* cited by examiner

| Change Item | Change Track | Submitter | Submitting time | Change Location | Change Type |
|---|---|---|---|---|---|
| 1 | 00001 | W.Z | 2011,11,12 | 01:96 | Code |
| 2 | 00003 | C.Q | 2012,04,25 | 07:1124 | Data |
| 3 | 00003 | C.Q | 2012,04,25 | 03:1175 | Alias |
| 4 | 00002 | Z.H | 2012,02,10 | 01:197 | Code |

Fig. 5

| Index | Change Track | Score | Submitter | Submitting time | Change Type | Change Location | Change Content |
|---|---|---|---|---|---|---|---|
| 1 | 27432 | 10 | X.Z | 2011,12,13 | Code | main.cpp:96 | main.cpp:96 |
| 2 | 27513 | 8 | H.X | 2011,11,24 | Data | best_cay.pp:768 | Findopt.h:24 |
|   |   |   |   |   | Alias | crack_sys.cpp:201 | Findopt.h:24 |
| 3 | 27498 | 5 | Z.H | 2012,02,10 | Data | main.cpp:223 | App:32 |

METHOD AND APPARATUS FOR PROVIDING CHANGE-RELATED INFORMATION

CROSS-REFERENCE TO RELATED APPLICATIONS

This application claims the benefit of China Application Number 201210364163.9 filed on Sep. 26, 2012, which is fully incorporated herein by reference.

BACKGROUND

In the process of software development, a developer composes source code with respect to a function to be achieved by software, and then a tester utilizes test cases to test the software that is built from the source code. Generally, the composing of the source code is completed step-by-step. The developer(s) (generally many developers for large-scale software) continually submit change tracks to the source code, so as to change, supplement and complete the source code. Then, there exists such a case where software built from a certain version of the source code may pass the test by test cases, but software, with several change tracks being added, cannot run properly and fails to pass the test by the same test cases. This phenomenon is named as software regression. In order to eliminate software regression, the developer needs to find out the change track causing software regression, and this is named as regression identification. The change track causing software regression is usually named as a defective change track.

A plurality of ways are used in the prior art to identify a defective change track, that is, to perform regression identification. In one solution, a test is performed in turn for a plurality of added change tracks. If software can pass the test at a certain change track i but cannot pass the test at the next change track (i+1), then the place of the change track (i+1) can be identified as a regression point, and the change track (i+1) can be identified as a defective change track. The solution can be combined with dichotomy to improve identification efficiency. For example, for n change tracks, the test starts from the place of n/2. If the test passes at the place of n/2, then the test is further performed at the intermediate between n/2 and n; if the test does not pass at the place of 2/n, then the test is further performed at the intermediate between the change track 1 and change track n/2, until the defective track defined hereinabove is identified. In such a solution, time spent by regression identification relies on the number n of change tracks, time b spent by each build and time t spent by test. On average, time spent for identifying a regression point is n/2*(b+t). For development and test of large-scale software, b and t may be very large, whereby such an identification process will take a very long time.

In another solution, each time a change track is submitted, software is re-built and tested. If software cannot pass the test by test cases, the newly added change track will be judged as a defective change track. Such a solution may easily determine a regression point. However, this solution increases the frequency of build and test significantly. For the development of some large-scale software, build and test with high frequency is unrealistic.

In addition to consuming more time and effort, the above solutions may determine the regression point, but cannot provide more detailed information so as to provide suggestions to developers as to debugging and error correction.

BRIEF SUMMARY

A method includes obtaining information of at least one change track that changes software source code, the at least one change track includes at least one change item, identifying at least one preliminary candidate change item from the at least change item, wherein preliminary candidate change item is a change item that causes the execution of the source code to change, and inserting, using a processor, an instrument in the source code at a location corresponding to the at least one preliminary candidate change item so that information of at least one candidate change item is outputted in a process of testing the source code using a test case. The at least one candidate change item is a change item related to the test case from the at least one preliminary candidate change item. The method further includes combining the information of at least one change track with the information of at least one candidate change item, and providing the change-related information based on the result of the combination.

A system includes a processor programmed to initiate executable operations. The executable operations include obtaining information of at least one change track that changes software source code, the at least one change track comprising at least one change item, identifying at least one preliminary candidate change item from the at least change item, wherein the preliminary candidate change item is a change item that causes the execution of the source code to change, and inserting an instrument in the source code at a location corresponding to the at least one preliminary candidate change item so that information of at least one candidate change item is outputted in a process of testing the source code using a test case. The at least one candidate change item is a change item related to the test case from the at least one preliminary candidate change item. The executable operations further include combining the information of at least one change track with the information of at least one candidate change item, and providing the change-related information based on the result of the combination.

A computer program product includes a computer readable storage medium having program code stored thereon. The program code is executable by a processor to perform a method. The method includes obtaining, using the processor, information of at least one change track that changes software source code, the at least one change track comprising at least one change item, identifying, using the processor, at least one preliminary candidate change item from the at least change item, the preliminary candidate change item is a change item that causes the execution of the source code to change, and inserting, using the processor, an instrument in the source code at a location corresponding to the at least one preliminary candidate change item so that information of at least one candidate change item is outputted in a process of testing the source code using a test case. The at least one candidate change item is a change item related to the test case from the at least one preliminary candidate change item. The method further includes combining, using the processor, the information of at least one change track with the information of at least one candidate change item, and providing the change-related information based on the result of the combination.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

The present invention relates to software regression tests, and more specifically, to a method and apparatus for providing change-related information for regression identification.

In view of the problems discussed above, various embodiments of the present invention are proposed for the purpose of providing a solution which helps regression identification and regression elimination in software regression testing by providing change-related information.

Change-related information may be provided during a single test of the source code using a test case. The change-related information can show change tracks and change items therein that possibly cause software regression. Such information is very favorable for efficiently identifying and eliminating software regression.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter solution, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
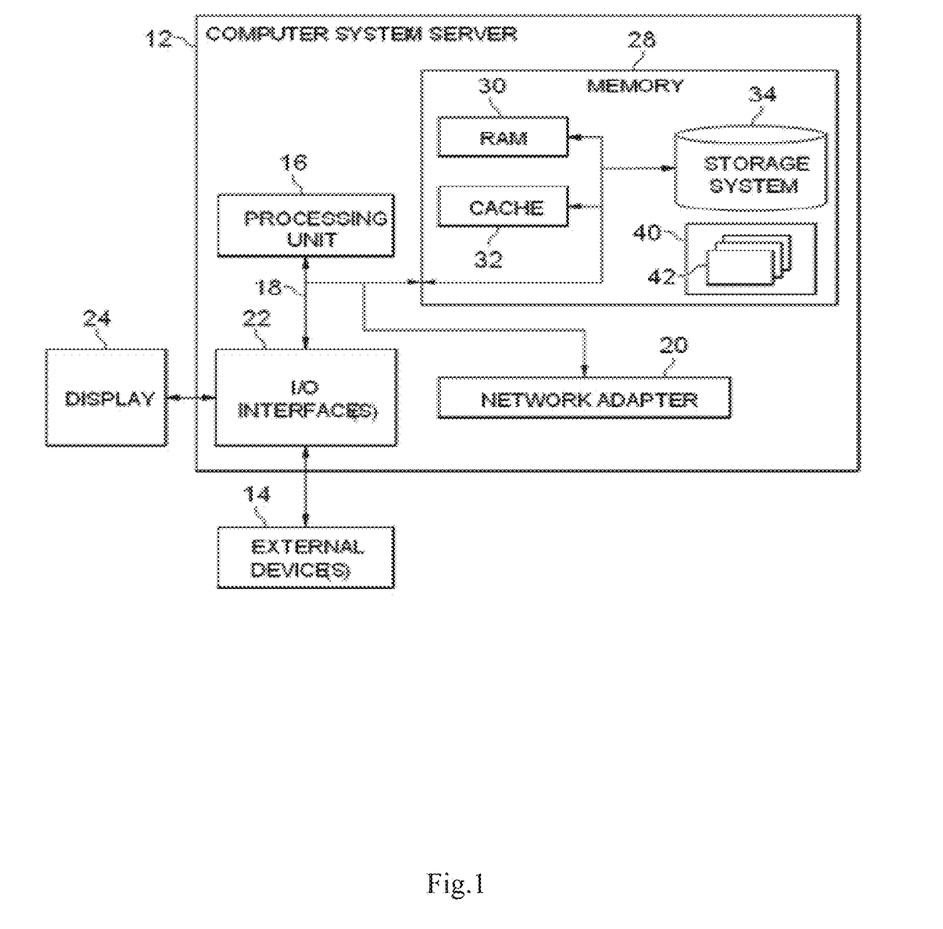
FIG. 1 shows an exemplary computer system which is applicable to implement the embodiments of the present invention.

Referring now to FIG. 1, an exemplary computer system/server 12 which is applicable to implement the embodiments of the present invention is shown. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be appreciated that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments of the present invention are described below in combination with drawings. In these embodiments, change-related information is provided to facilitate identification and elimination of software regression. The change-related information is intended to show information of change tracks and change items therein that may cause software regression. In order to filter out change items that may cause software regression, the range of candidate change items is gradually narrowed by identifying categories of change items and selecting change items related to test cases. Thus, the change-related information provided can accurately reflect change tracks with greater possibility to cause software regression. Such information helps a lot in quickly identifying a regression point of software. Also, the change-related information provided according to the embodiments may provide information for candidate change items, that is, provide more fine-grained information than the prior art, and thus give further reference information for eliminating software regression.

Figure 2:
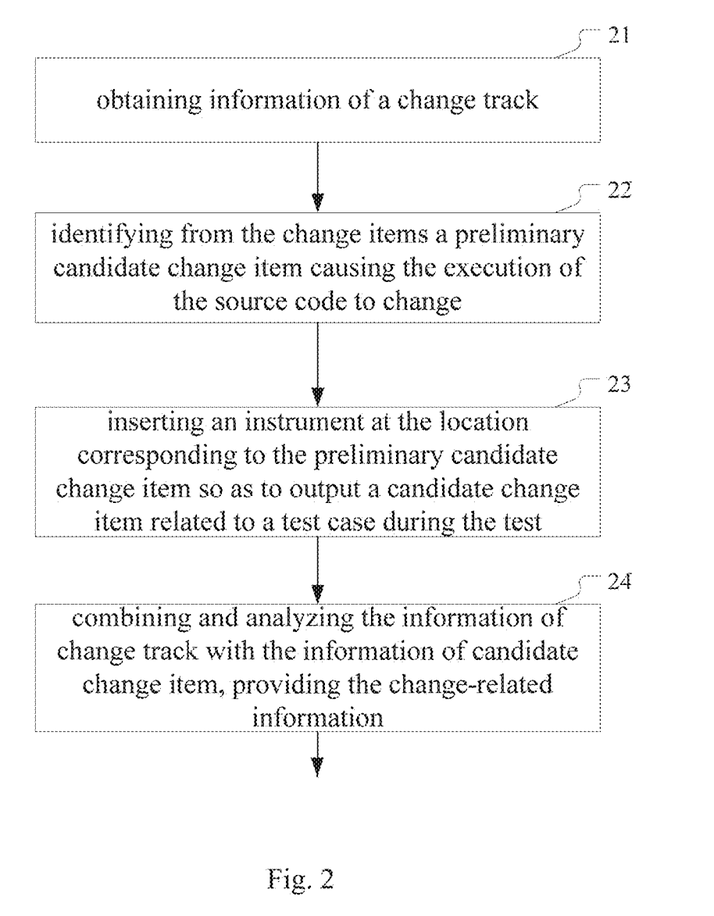
FIG. 2 illustrates a flowchart of a method of providing change-related information according to an embodiment of the present invention.

Reference is made to FIG. 2 now, which illustrates a flowchart of a method of providing change-related information according to an embodiment of the present invention. As illustrated, the method of providing change-related information in this embodiment includes the following steps of: step 21, obtaining information of at least one change track that changes software source code, the at least one change track including at least one change item; step 22, identifying from the at least change item at least one preliminary candidate change item that causes the execution of the source code to change; step 23, inserting an instrument in the source code at the location corresponding to the preliminary candidate change item so that information of at least one candidate change item may be outputted in the process of testing the source code using a test case, wherein the candidate change item is the change item related to the test case from the at least one preliminary candidate change item; and step 24, combining the information of the change track with the information of the candidate change item, thereby providing the change-related information. The execution of the steps is described below in combination with specific examples.

As described previously, in the process of software development, developers continually submit change tracks to the source code. For the purpose of description, assumed that the last source code version that has passed test by the test case is v0. Thereafter, the developers submit change tracks 1, 2, . . . n, respectively, resulting in the source code with version v1. In general, a change track can include several change items, and a change item is representative of a change in a line of the source code.

Typically, the submitted change tracks 1-n may be managed through a change track knowledge base (or known as a version management system). Examples of the version management system include ClearCase, CVS, Endevor RTCz, etc. The above version management system can record and manage the information of respective change tracks. Such information includes submitter of a change track, submitting time of the change track and information of change items in the change track. Information of change items may include location where a change occurs such as which line of which file of the source code a change occurs in, specific content of change, etc. In one embodiment, a change item is identified using the location where a change occurred (e.g., the file name and line number). In the case where the version management system is used to manage the development process of software, the step 21 in FIG. 2 can be executed by accessing the version management system, that is, information of change tracks is obtained from the version management system.

According to another embodiment, in step 21, the submission of change tracks by developers may be directly captured, and the captured change tracks are labeled and organized, thereby obtaining information of change tracks.

In another embodiment, in step 21, part of information of change tracks may be obtained by comparing contents of different versions of the source code.

It may be appreciated that in addition to the above manners by way of example, with the existing or future developed tools and means, those skilled in the art can use other manners to obtain information of change tracks. These manners are also encompassed within the scope of various embodiments of the invention.

As described above, by executing step 21, information of change tracks can be obtained which includes information of change items. Next, in step 22, the obtained change items are analyzed, from which preliminary candidate change items are identified, namely, those change items causing the execution of the source code to change.

Among a variety of changes to the source code, part of the changes will not cause the execution of the source code to change essentially, for example, adding comments, deleting blank lines, etc. Since they do not affect the execution of the source code, such changes cannot be reasons that cause software regression. Therefore, step 22 is intended to preliminarily narrow down the range of change items causing software regression by excluding those change items not affecting the execution of software.

By studying change items, the inventor finds that change items causing the execution of the source code to change include at least the following three categories of change items: code change, data change and alias change.

The code change is a change made with respect to logic relationship of a piece of code. In real program execution, most program failures are caused by code changes. Data change is a change made with respect to attributes of data, such as data initial value, data type (integer or floating point, etc.), data length and so on. The data change is also an important reason causing the test failure. For the above two types of changes, they can be identified in multiple ways.

In one embodiment, code change and data change are identified by analyzing abstract syntax tree, or AST, generated by the front end of a program compiler. Those skilled in the art may understand that the front end of the compiler parses the input source code through the co-working of a syntax analyzer and a semantic analyzer. Through the parsing of the source code, intermediate code and an abstract syntax tree AST that is not dependent on the programming language of the source code can be generated. AST is a tree-shape representation form of the abstract syntax structure of the source code in which nodes on the tree as well as the structure between the nodes are used to represent the logical structure of the source code. For example, for a conditional jump statement such as if-condition-then, AST can use a node with two branches to represent its logical structure. On the other hand, as described previously, each change item can be identified using the location where the change occurred such as the line number. With the location identification of the change item, the change item can be located correspondingly to a specific node of AST by traversing the AST tree. With structure information of the node, the type of the change item can be determined. Specifically, if the node structure indicates that the node corresponds to a statement, then it can be determined that the corresponding change item is a code change; if the node structure indicates that the node corresponds to a data declaration, then the corresponding change item is a data change.

In another embodiment, the change content of the change item is scanned directly, and a syntax analysis is performed on the change content, thereby identifying the code change and the data change. Under the guidance of the above inventive concept, it is also possible for those skilled in the art to use other means to identify the code change and the data change.

Figure 3:
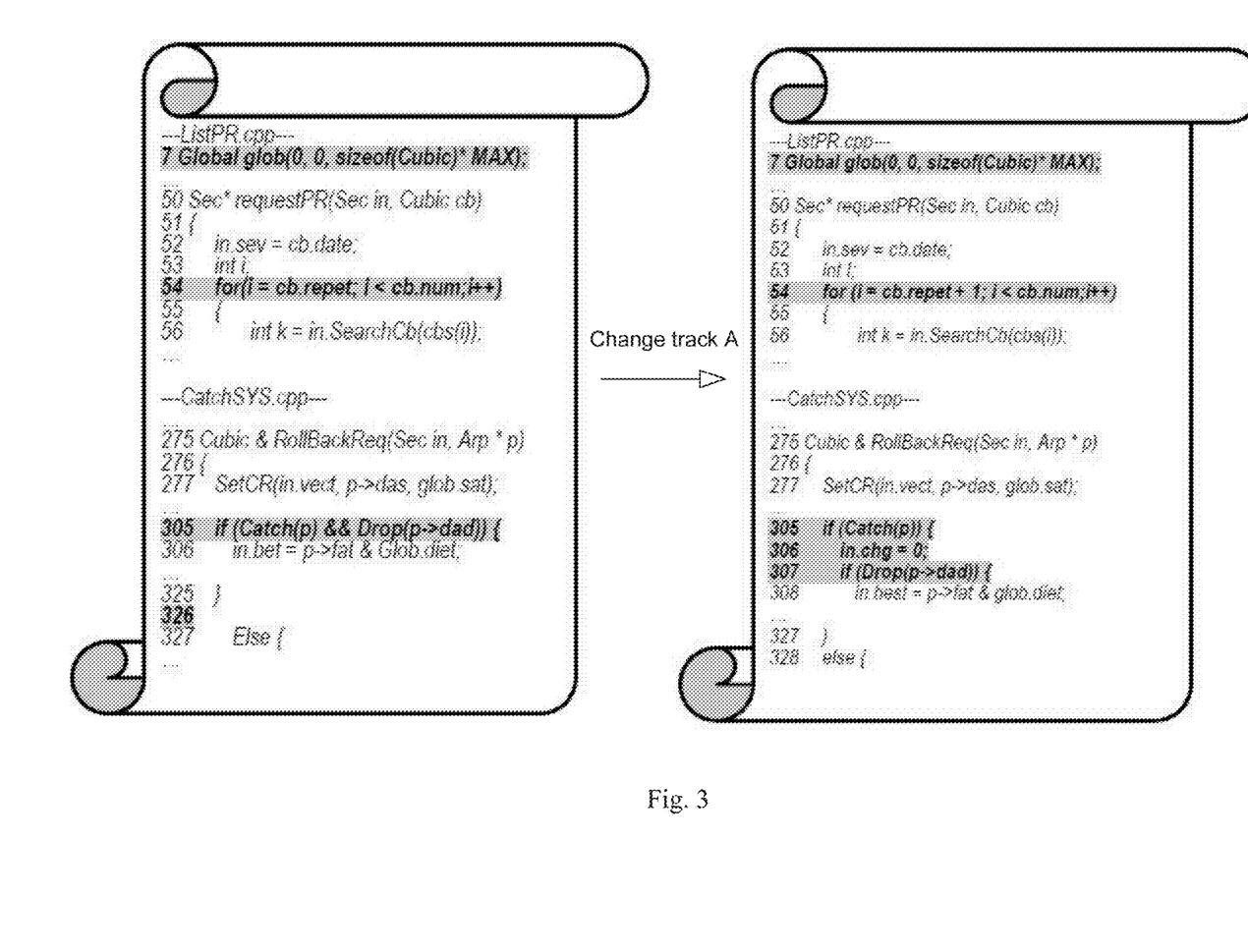
FIG. 3 illustrates an example of a change track.

FIG. 3 illustrates an example of a change track. In the example of FIG. 3, a code segment on the left side shows a portion of the source code, and a code segment on the right side shows the corresponding source code after a change track A is added. It can be seen that the change track A contains multiple changes items, including changes to line 7, line 54, line 305 and line 326 of the source code. Through the identification of types of change items using the above method, it can be determined that both the change to line 54 and the change to line 305 are code changes. For example, the initial value of the execution condition of the loop statement guided by "for" in line 54 is changed from cb.repet to cb.repet+1, thereby changing the execution logic of the program. Also, it can be determined that the change to line 7 is a data change, which changes the attributes definition for variable data "glob". It can be appreciated that such changes are change items that may likely cause software regression.

In addition to the code change and data change, another possible change that may cause the software execution to change is an alias change. The alias is a relationship between multiple variables sharing the same storage location, while the alias change changes the storage location shared with other data. For example, with reference to the following two simple code segments:

```
int array[100], *p;
...
p = array;
here, p is an alias of "array".
void func(int * x, int * y)
{
    *x = *y + 3;
}
...
int c;
...
func(&c, &c);
```

In the above code segment, x takes the address of y, and then x is an alias of y.

In the case of alias change, although the change item may not directly change a data, since the data and its alias share the same storage location, the change to the alias will also cause the data to change.

In the process of program source code compiling, the compiler may obtain alias information of all variables through code analysis. With such alias information, when generating intermediate code, the compiler may identify a change item that makes an alias change by detecting possible aliases of a variable and determining whether its alias variable belongs to one of the above data change items.

Through the above steps, the code change, data change and alias change are identified, respectively. Since these three changes will cause the execution of the source code to change, in step 22, the three change types of change items are identified as preliminary candidate change items.

Preliminary candidate change items are identified based on three specific change types above. However, it may be appreciated that the change types may be divided into different categories from a different point of view, whereby preliminary candidate change items are selected based on other criteria. In one embodiment, changes that may not cause the execution of the source code to change may be classified and identified, and after such changes items are identified, the rest change items are considered as preliminary candidate change items. Therefore, taught by the above inventive concept, those skilled in the art may use various classification and identification methods to exclude from the obtained change items those that are impossibly considered as reasons for software regression, thereby preliminarily narrowing down the range of change items.

In one embodiment, information relevant to the identified preliminary candidate change items is recorded, and thus preliminary candidate change item information is provided. Such information may include, for example, identifier (change location), change type, etc. of each change item in the preliminary candidate change items. For the change items of data change type, the changed data symbols may further be recorded; for the change items of alias change type, the changed aliases may also be recorded.

Next, as shown in FIG. 2, in step 23, an instrument is inserted in the source code at the location corresponding to a preliminary candidate change items, so that information of a candidate change item related to the test case can be outputted. This step is intended to further narrow down the range of change items causing software regression, that is, to further filter out from the preliminary candidate change items the change items related to the test case, and output information thereof. The execution of step 23 is based on the idea that the failure of the changed source code in the testing using the test case must be attributed to those change items used during the execution of the test cases.

Figure 4:
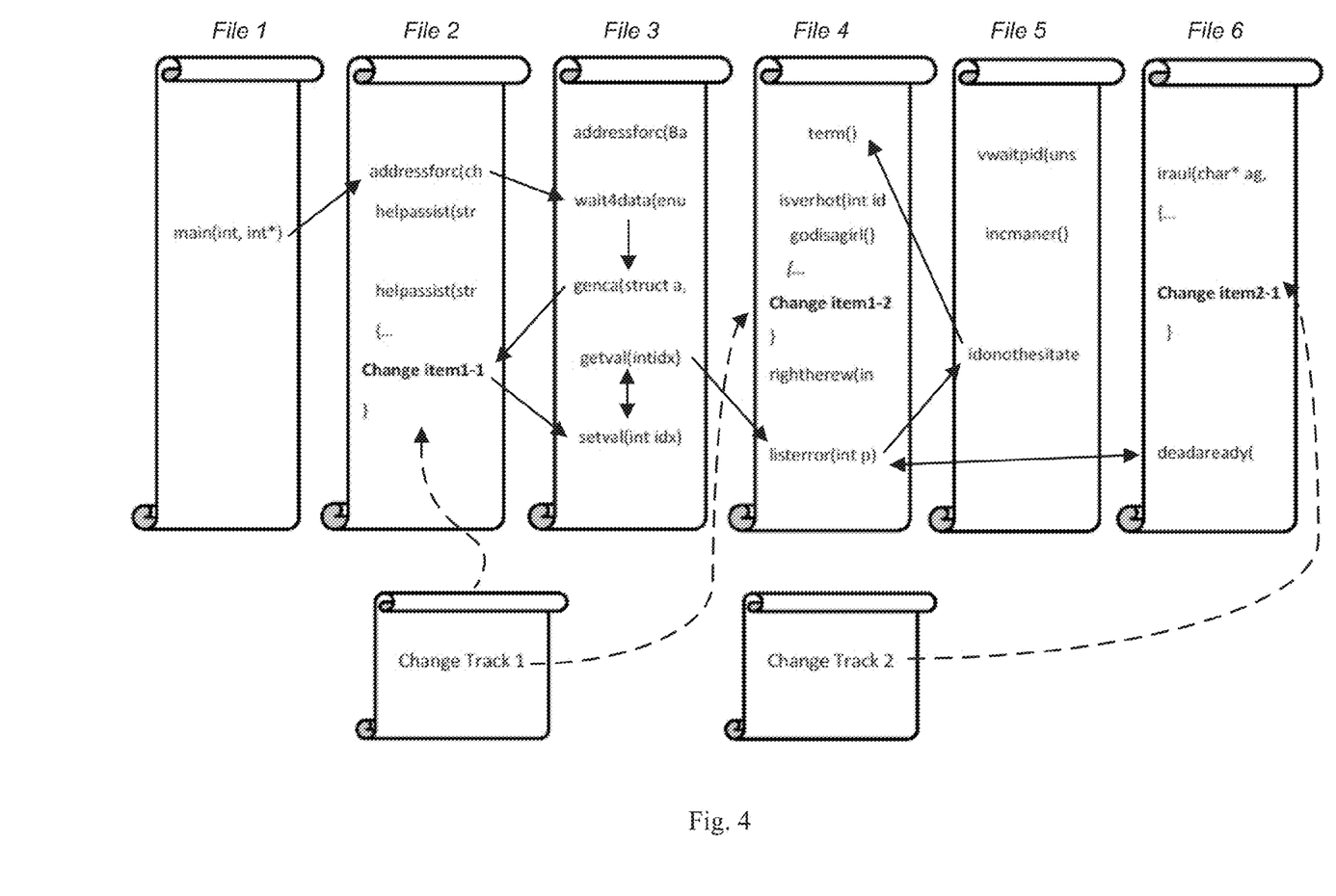
FIG. 4 illustrates a schematic diagram of an execution path of a test case in a source code.

FIG. 4 illustrates a schematic diagram of an execution path of a test case in source code. Specifically, FIG. 4 schematically illustrates six files contained in the source code as well as part of source code segments therein. Furthermore, change tracks 1 contains change item 1-1 and change item 1-2, wherein the change item 1-1 changes file 2, and the change item 1-2 changes file 4. Change item 2-1 in change track 2 changes file 6. Code segments executed by a test case during the execution are denoted by arrows in FIG. 4, which constitute an execution path of the test case. It can be seen that, after executing the third segment of code in file 3, the test case jumps to the file 2 to execute the code corresponding to the change item 1-1. However, the execution path of the test case does not pass the change item 1-2 and change item 2-1, that is, these two change items have not been executed during the execution of the test case. Therefore, no matter what changes to the source code by the change items 1-2 and 2-1, these two change items will not affect the execution result of the test cases. Hence, the change item 1-2 and change item 2-1 are impossible to be reasons causing the test case failure. Thus, the reasons for software regression may be further focused on change items intersecting with the execution path of the test case, that is, change items related to the test case. Since the execution path of the test case cannot be pre-determined before the test case is actually executed, accordingly, change items related to the test case can only be determined during the execution.

In order to obtain information of changes items related to the test case, in step 23, instruments are inserted in the source code at the locations corresponding to the preliminary candidate change items. Generally, an instrument may be used to detect runtime status information at the location where the instrument is inserted, and output a relevant result. In one embodiment, the instrument is set to output information of the change item at the location of the instrument. As a result, in the process of using the test case to test the source code, if the execution path of the test case passes a certain change item, the instrument at that change item is executed, and then information of the corresponding change item can be outputted; on the contrary, if the execution path of the test case does not pass a certain change item, the instrument at that change item is not executed, and then information of that change item will not be outputted. Thus, through the insertion of instruments at locations of the preliminary candidate change items and the use of the test case for testing, information of change items that are related to the test case (i.e., candidate change items) in the preliminary candidate change items can be outputted.

In one embodiment, the instrument is inserted in the intermediate code generated based on the source code. It can be understood that in the process of compiling the source code, the program compiler can generate an intermediate representation form between the source code and machine-executable code, i.e., the intermediate code. The compiler backend can optimize the intermediate code to improve execution efficiency. The instrument can be inserted in the intermediate code to track the execution of test case without changing the source code. In order to execute the step of inserting the instrument, the corresponding locations of the preliminary candidate change items in the intermediate code are first determined. As described previously, in the step of identifying the preliminary candidate change items, the respective change items are identified by the change locations. With the change locations of the respective preliminary candidate change items in combination with the correspondence relationship between the source code and intermediate code, the locations of the preliminary candidate change items in the intermediate code can be readily determined. Then, codes implementing instrument functions can be inserted at such locations. Monitoring the execution status of the program by inserting instruments is a conventional method used by those skilled in the art for software test. Therefore, under the premise that the location and function of the instruments are determined, those skilled in the art can implement the insertion of the instruments in a variety of ways. In one embodiment, the change types of the preliminary candidate change items are referred to in the insertion of the instrument, so that the instrument is set to output the change types of the change items at corresponding locations.

After the instruments are inserted as described above, once the source code is tested and executed using the test case, information of change items through which the execution path passes, namely, information of the candidate change items, will be automatically outputted. In accordance with the setting of the instruments, the information outputted may include identification, change type, etc. of the candidate change items.

Through the above steps 22 and 23, the range of change items that may be reasons for software regression is gradually narrowed down. The candidate change items outputted are selected as those causing the execution of program to change while being closely related to the test case. Such change items have the largest possibility to cause software regression.

Further, in order to make the provided change-related information more understandable, in step 24, the information of change tracks obtained in step 21 is combined with the information of the candidate change items outputted in step 23, thereby providing change-related information.

As mentioned previously, the information of change tracks obtained in step 21 may include basic information such as the submitter of change track, submitting time of change track and the like, and further include information of change items in the change track. Through the relationship between change tracks and change items contained in the information of change tracks, it can be readily determined which change track each candidate change item contained in step 23 is from. Thus, the information of the candidate change items obtained in step 23 can be combined with the information of change tracks obtained in step 21, and based on the result of combination, it can be provided full information related to the candidate change items, i.e., change-related information.

Figure 5:
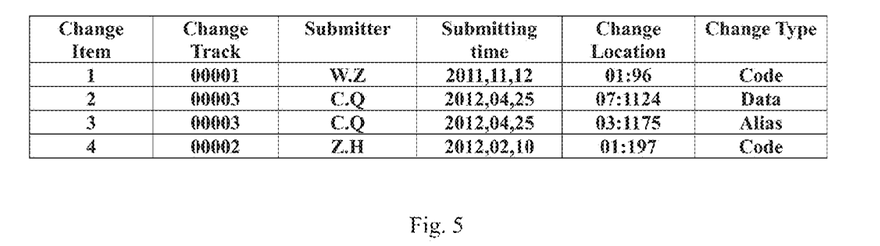
FIG. 5 illustrates a schematic diagram of change-related information provided according to an embodiment of the present invention.

FIG. 5 illustrates a schematic diagram of change-related information provided according to an embodiment of the present invention. In the example of FIG. 5, there are shown four change items which are the candidate change items identified by the steps 22 and 23. For each candidate change item, the following information is provided: change track from which the change item comes, the submitter of the change track, submitting time of the change track, change location of the change item (denoted by file name and line number), and change type. In the example of FIG. 5, it can be seen that change items 2 and 3 come from the same change track.

In the example of FIG. 5, the change-related information is shown by using change item as index. In another embodiment, change track can be used as index to show change-related information.

In one embodiment, step 24 further includes analyzing the combined change-related information to show more additional information. In one example, based on the information of the candidate change items, the possibility that a change track being a defective change track is evaluated. Specifically, a change track can be scored based on the information of the candidate change items so that score of the change track shows the possibility that the change track causes the software regression. In one embodiment, the number of candidate change items contained in each change track is counted and used as the score of the change track. In another embodiment, different factors or weights are assigned to different change types. The factors or weights show the relative probability that different change types cause the program failure. For example, in one specific example, the factor for change items of code change is set to 10, the factor for change items of data change is set to 5, and the factor for change items of alias change is set to 3. Candidate change items contained in a change track are summed by weights based on the assigned factors, and the result of summation is used as the score of the change track.

Figure 6:
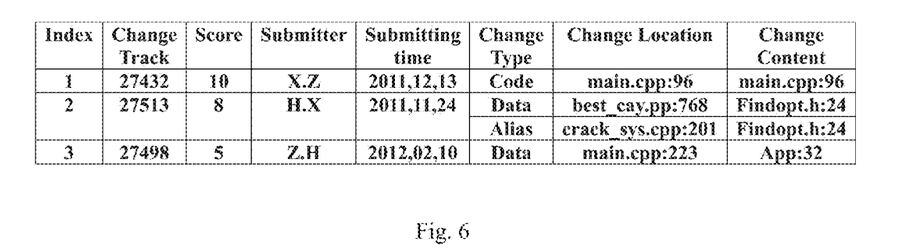
FIG. 6 illustrates a schematic diagram of change-related information provided according to another embodiment of the present invention.

FIG. 6 illustrates a schematic diagram of change-related information provided according to another embodiment of the present invention. In the example of FIG. 6, change-related information is shown by using change track as index. For each change track, identification, submitter, and submitting time of the change track are provided; furthermore, information of candidate change items contained in the change track is also shown, including change types and change locations of the candidate change items. For data change and alias change, change content may also be shown, i.e., symbol name of the changed data. In addition, each change track is scored based on the information of candidate change items contained in the change track. The score of the change track in FIG. 6 is obtained by summing the candidate change items therein by weight. Thus, FIG. 6 illustrates more comprehensive change-related information.

On the basis of the example shown in FIG. 6, in one embodiment, change tracks can further be ranked according to their scores, so that respective change tracks are arranged in order from high score to low score in the change-related information.

It can be appreciated that the form and content of the provided change-related information are not limited to the examples shown in FIG. 5 and FIG. 6. For the information of obtained change track and the information of identified candidate change items, those skilled in the art can make a variety of combinations and analysis thereon according to needs to obtain change-related information, and organize and present the change-related information in various ways.

Using the above provided change-related information, regression identification and regression elimination can be performed more conveniently. Specifically, the change-related information lists change tracks and change items that are more likely to cause software regression, whereby a check may be made with respect to the listed change items. In addition, in the case of scoring change items and change tracks, the probability that a change track acts as a defective change track can be obtained through the scores, and a check can be made according to probability from high to low, so as to more quickly locate the defective change track. Also, as described previously, since information of each candidate change item is also given in the change-related information, on the basis that a regression point is determined, it may further be determined the change items causing software regression, that is, defective change items. The provision of such fine-grained information helps a lot in the elimination of software regression.

On the other hand, it may be appreciated that the above change-related information is generated in real time during the test of the entire changed source code using the test case. That is, for change tracks 1–n provided from the source code version v0 to version v1, candidate change items in the change tracks 1–n can be obtained by performing the test case only once, without needing to repeat multiple builds and tests, which greatly reduces time spent by regression identification. Of course, the changed source code may also be tested using multiple test cases respectively, thereby obtaining the change-related information described above in many times. Through a comprehensive analysis of the change-related information obtained in many times, the source code can be tested and debugged more comprehensively.

Figure 7:
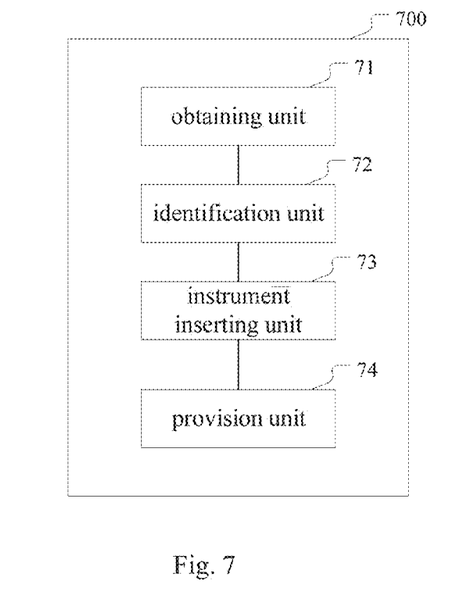
FIG. 7 illustrates a block diagram of an apparatus of providing change-related information according to an embodiment of the present invention.

Based on the same inventive concept, embodiments of the present invention further provide an apparatus for providing change-related information. FIG. 7 illustrates a block diagram of an apparatus of providing change-related information according to an embodiment of the present invention. As shown, the apparatus for providing change-related information is denoted as a whole by 700. Specifically, the apparatus 700 includes: an obtaining unit 71 configured to obtain information of at least one change track that changes software source code, the at least one change track including at least one change item; an identification unit 72 configured to identify from the at least change item at least one preliminary candidate change item causing the execution of the source code to change; an instrument inserting unit 73 configured to insert an instrument in the source code at the location corresponding to the preliminary candidate change item so that information of at least one candidate change item is outputted in the process of testing the source code using a test case, wherein the candidate change item is the change item related to the test case from the at least one preliminary candidate change item; and a provision unit 74 configured to combine the information of change track with the information of candidate change item, and thereby to provide the change-related information.

In one embodiment, the obtaining unit 71 is configured to obtain information of the at least one change track by accessing a version management system.

In one embodiment, the identification unit 72 is configured to identify change items with change types of code change, data change, and alias change as preliminary candidate change items.

In one embodiment, the identification unit 72 is configured to identify change items with change types of code change and data change by analyzing an abstract syntax tree generated by a program compiler.

In one embodiment, the identification unit 72 is configured to identify change items of alias changes by analyzing alias information provided by the program compiler.

In one embodiment, the instrument inserting unit 73 is configured to: determine the corresponding location of the at least one preliminary candidate change item in intermediate code of the source code; and insert an instrument at the corresponding location in the intermediate code of the source code, the instrument being set to output information of a preliminary candidate change item where the instrument is located.

In one embodiment, the provision unit 74 is configured to score a change track based on the information of the at least one candidate change item in the change-related information, so as to show the probability that the change track causes the software regression.

In one embodiment, the provision unit 74 is configured to assign different weights to change items with different change types, sum the candidate change items contained in the change track by weight based on the assigned weights, and use the result of summation as the score of the change track.

In one embodiment, the change-related information includes: information of at least one candidate change item which comprises at least one of change location, change type, and change content of respective candidate change item, and information of a change track corresponding to the at least one candidate change item which includes the score of the change track and one or more of submitter and submitting time of the change track.

The specific ways of implementing the above units correspond to the description of the steps in FIG. 2, and are not discussed here any more.

It may be appreciated that the respective units 71-74 in FIG. 7 are divided in terms of function. Although these units are shown in FIG. 7 as being included in the apparatus 700, but this does not mean that all units must be physically resident on a same platform or included in a same software module. In one embodiment, the apparatus 700 functions as a stand-alone apparatus or tool for providing change-related information to developers and testers, thereby assisting regression identification and regression elimination. In another embodiment, a part of units of the apparatus 700 may be incorporated into existing tools or modules.

Figure 8:
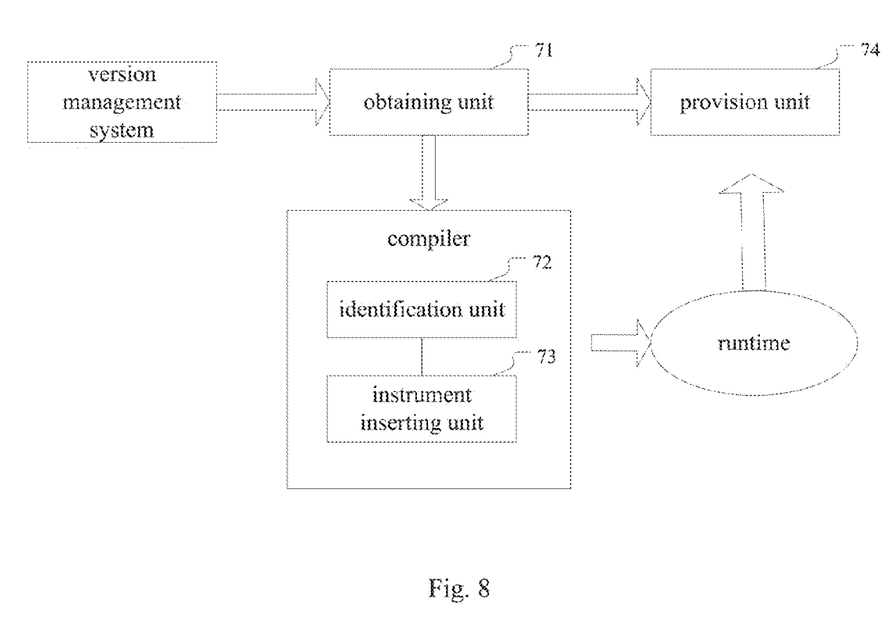
FIG. 8 illustrates a structural diagram of an apparatus according to an embodiment of the present invention.

FIG. 8 illustrates a structural diagram of an apparatus according to an embodiment of the present invention. In the example of FIG. 8, the obtaining unit 71 is connected to a version management system, thereby obtaining information of change tracks. The identification unit 72 and the instrument insertion unit 73 are embedded in the existing compiler, so as to implement their functions more conveniently. When the source code is compiled by the compiler, the identification unit 72 implements identification of preliminary candidate change items, in combination with a preliminary code analysis performed by the compiler, and the instrument inserting unit 73 implements the insertion of instruments in the back end of the compiler. The complied source code provides run results in runtime through building and testing. The provision unit 74 obtains the information of change tracks and the information of candidate change items from the obtaining unit 71 and the runtime, respectively, and provides change-related information based on the combination and analysis of the information. FIG. 8 is an implementation of the apparatus 700, but the structure implementation of the apparatus 700 is not limited as shown in FIG. 8. Under the teachings of embodiments of the present invention, those skilled in the art can arrange units of the apparatus 700 in a same or different physical platforms and software tools according to needs, as long as these units cooperate with each other to implement the functions described above. Modifications to the structure of the apparatus 700 should be included within the scope of the embodiments of the present invention.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some candidate implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many changes and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
obtaining information of at least one change track that changes software source code, the at least one change track comprising at least one change item;

identifying at least one preliminary candidate change item from the at least change item, the preliminary candidate change item is a change item that causes the execution of the source code to change;

inserting, using a processor, an instrument in the source code at a location corresponding to the at least one preliminary candidate change item so that information of at least one candidate change item is outputted in a process of testing the source code using a test case, the at least one candidate change item is a change item related to the test case from the at least one preliminary candidate change item; and combining the information of at least one change track with the information of at least one candidate change item, and providing the change-related information based on the result of the combination.

2. The method according to claim 1, wherein the obtaining information of at least one change track that changes software source code comprises:

obtaining information of the at least one change track by accessing a version management system related to the software source code.

3. The method according to claim 1, wherein the identifying at least one preliminary candidate change item comprises:

identifying change items of code change, of data change, and of alias change as preliminary candidate change items.

4. The method according to claim 3, wherein the identifying at least one preliminary candidate change item comprises:

identifying change items of code change and of data change by analyzing an abstract syntax tree generated by a program compiler with respect to the source code.

5. The method according to claim 3, wherein the identifying at least one preliminary candidate change item comprises:

identifying change items of alias change by analyzing alias information provided by a program compiler with respect to the source code.

6. The method according to claim 1, wherein the inserting an instrument comprises:

determining a corresponding location of the at least one preliminary candidate change item in intermediate code generated by a program compiler with respect to the source code; and inserting an instrument in the intermediate code at the corresponding location, the instrument is set to output information of a preliminary candidate change item where the instrument is located.

7. The method according to claim 1, further comprising:

scoring a change track based on the information of the at least one candidate change item in the change-related information, so as to show the probability that the change track causes a software regression.

8. The method according to claim 7, wherein the scoring a change track comprises:

assigning different weights to change items of different change types, summing the candidate change items contained in the change track by weight based on the assigned weights, and using the result of summation as the score of the change track.

9. The method according to claim 7, wherein the change-related information comprises:

the information of at least one candidate change item, which comprises at least one of change location, change type, and change content of candidate change item; and information of a change track corresponding to the at least one candidate change item, which comprises the score of the change track and one or more of submitter and submitting time of the change track.

10. A system comprising:

a processor programmed to initiate executable operations comprising:

obtaining information of at least one change track that changes software source code, the at least one change track comprising at least one change item;

identifying at least one preliminary candidate change item from the at least one change item, the preliminary candidate change item is a change item that causes the execution of the source code to change;

inserting an instrument in the source code at a location corresponding to the at least one preliminary candidate change item so that information of at least one candidate change item is outputted in a process of testing the source code using a test case, the at least one candidate change item is a change item related to the test case from the at least one preliminary candidate change item; and combining the information of at least one change track with the information of at least one candidate change item, and providing the change-related information based on the result of the combination.

11. The system according to claim 10, wherein the obtaining information of at least one change track that changes software source code comprises:

obtaining information of the at least one change track by accessing a version management system related to the software source code.

12. The system according to claim 10, wherein the identifying at least one preliminary candidate change item comprises:

identifying change items of code change, of data change, and of alias change as preliminary candidate change items.

13. The system according to claim 12, wherein the identifying at least one preliminary candidate change item comprises:

identifying change items of code change and of data change by analyzing an abstract syntax tree generated by a program compiler with respect to the source code.

14. The system according to claim 12, wherein the identifying at least one preliminary candidate change item comprises:

identifying change items of alias change by analyzing alias information provided by a program compiler with respect to the source code.

15. The system according to claim 10, wherein the inserting an instrument comprises:

determining a corresponding location of the at least one preliminary candidate change item in intermediate code generated by a program compiler with respect to the source code; and inserting an instrument in the intermediate code at the corresponding location, the instrument is set to output information of a preliminary candidate change item where the instrument is located.

16. The system according to claim 10, further comprising:

scoring a change track based on the information of the at least one candidate change item in the change-related information, so as to show the probability that the change track causes a software regression.

17. The system according to claim 16, wherein the scoring a change track comprises:

assigning different weights to change items of different change types, summing the candidate change items contained in the change track by weight based on the assigned weights, and using the result of summation as the score of the change track.

18. The system according to claim 16, wherein the change-related information comprises:
the information of at least one candidate change item, which comprises at least one of change location, change type, and change content of candidate change item; and
information of a change track corresponding to the at least one candidate change item, which comprises the score of the change track and one or more of submitter and submitting time of the change track.

19. A computer program product comprising
a computer readable storage medium having program code stored thereon, wherein the program code is executable by a processor to perform:
obtaining, using the processor, information of at least one change track that changes software source code, the at least one change track comprising at least one change item;
identifying, using the processor, at least one preliminary candidate change item from the at least one change item, the preliminary candidate change item is a change item that causes the execution of the source code to change;
inserting, using the processor, an instrument in the source code at a location corresponding to the at least one preliminary candidate change item so that information of at least one candidate change item is outputted in a process of testing the source code using a test case, the at least one candidate change item is a change item related to the test case from the at least one preliminary candidate change item; and
combining, using the processor, the information of at least one change track with the information of at least one candidate change item, and providing the change-related information based on the result of the combination.

20. The computer program product of claim 19, wherein the obtaining information of at least one change track that changes software source code comprises:
obtaining information of the at least one change track by accessing a version management system related to the software source code.

* * * * *